United States Patent [19]

Kanter

[11] Patent Number: 4,757,201

[45] Date of Patent: Jul. 12, 1988

[54] DOSIMETER FOR MONITORING FOOD IRRADIATION

[75] Inventor: Ira E. Kanter, Monroeville, Pa.

[73] Assignee: Westinghouse Electric Corp., Pittsburgh, Pa.

[21] Appl. No.: 875,152

[22] Filed: Jun. 17, 1986

[51] Int. Cl.$^4$ .......................... G01T 1/11; G01F 23/00
[52] U.S. Cl. .................. 250/337; 250/358.1; 250/359.1; 250/357.1
[58] Field of Search .................. 250/253, 337, 357.1, 250/390.01, 432 R, 358.1, 359.1

[56] References Cited

U.S. PATENT DOCUMENTS

| 3,531,638 | 9/1970 | Badgett | 250/357.1 |
|---|---|---|---|
| 3,582,653 | 6/1971 | Howard | 250/337 |
| 3,665,197 | 5/1972 | Richter | |
| 3,783,292 | 1/1974 | Alter et al. | |
| 3,786,254 | 1/1974 | Yamashita et al. | 250/337 |
| 3,894,238 | 7/1975 | Cox et al. | 250/484.1 |
| 4,053,772 | 10/1977 | Felice | 250/337 |
| 4,179,614 | 12/1979 | Felice et al. | 250/253 |
| 4,186,303 | 1/1980 | Smith et al. | 250/253 |
| 4,590,377 | 5/1986 | Lukens | 250/361 R |

FOREIGN PATENT DOCUMENTS

| 1240057 | 7/1960 | France. | |
| 2511160 | 8/1981 | France. | |
| 888107 | 1/1962 | United Kingdom. | |
| 843572A | 9/1983 | U.S.S.R. | 250/390 |

OTHER PUBLICATIONS

"Calcium Fluoride (TLD-200) Thermoluminescent Dosimeters", Harshaw Chemcal Co., May 1972.

Primary Examiner—Janice A. Howell
Attorney, Agent, or Firm—D. C. Abeles

[57] ABSTRACT

A device for monitoring the irradiation of bulk material composed of a carrier body having an outer surface formed to present a plurality of facets and constructed to receive a radiation sensor on each facet; and a plurality of radiation sensors each removably mounted on a respective facet of the carrier body.

13 Claims, 2 Drawing Sheets

DOSIMETER FOR MONITORING FOOD IRRADIATION

BACKGROUND OF THE INVENTION

The present invention relates to dosimeter devices for monitoring food irradiation.

In the food industry, it has long been the practice to inhibit food spoilage and destroy or neutralize harmful impurities, such as bacteria and insects, by the addition or application of chemicals. However as evidence of the harmful effect of the additive chemicals themselves accumulates, other techniques for achieving these results have begun to be investigated.

One promising alternative to chemical additives is irradiation. Studies conducted to date indicate that this technique can achieve good levels of deinfestation, preservation, and shelflife extension, while no harmful side effects have been detected.

This technique is already being utilized in the U.S. for treating spices and it is expected to be adopted in the near future for certain processed meat products. It is likely that irradiation will soon be authorized for fresh fruits and vegetables.

Government approval of irradiation processes will be strongly dependent on the availability of techniques for accurately determining the total radiation dose received by the foodstuff to assure that it will be safe for human consumption.

Regulations governing allowable radiation doses will in all probability be based on the average radiation dose received by large bulk volumes of the foodstuff. One possibility for monitoring average dose values would be to submerge an appropriate sensor within the bulk volume, the sensor being separated from the radiation source by a predetermined distance.

SUMMARY OF THE INVENTION

It is an object of the present invention to provide a device and method for satisfactorily monitoring the average radiation dose received by bulk foodstuff.

Another object of the invention is to monitor radiation incident within the bulk volume from a number of different directions in order to provide a more accurate indication of the average radiation dose.

The above and other objects are achieved, according to the invention by a device for monitoring the irradiation of bulk material comprising:

a carrier body having an outer surface formed to present a plurality of facets and constructed to receive a radiation sensor on each facet; and a plurality of radiation sensors each removably mounted on a respective facet of the carrier body.

DESCRIPTION OF THE PREFERRED EMBODIMENTS

Figure 1:
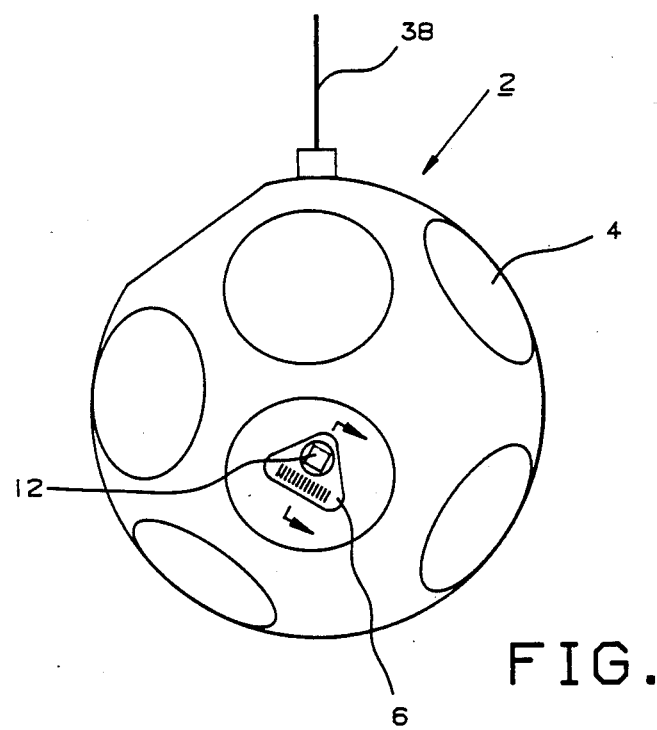
FIG. 1 is a pictorial view of a preferred embodiment of a radiation detector according to the invention.

FIG. 1 is a pictorial view of a preferred embodiment of a gamma radiation detector according to the present invention, composed of a multifaceted, hollow body 2 which, in this embodiment, has the general form of a sphere interrupted by regularly distributed flat surfaces 4 of circular outline. The number of flat surfaces 4 may be of the order of ten or twelve. Each flat surface 4 is provided for mounting of a respective radiation sensor 6. This arrangement provides radiation sensors which face in a plurality of uniformly distributed directions. Bodies 2 having a different overall shape or number of facets may be employed in accordance with the invention, so long as the number of facets permits monitoring of radiation from a suitable number of directions.

Figure 2:
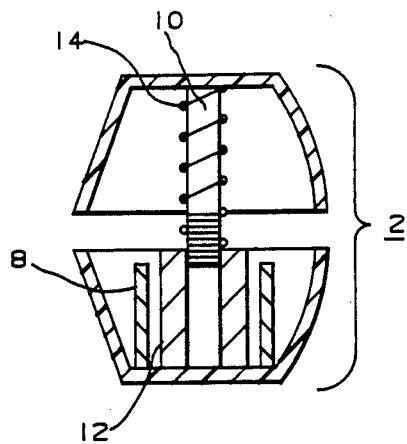
FIG. 2 is a cross-sectional view of the embodiment of FIG. 1.

As shown in FIG. 2, body 2 is preferably made of two parts which are separable to permit the insertion of ballast 8 for the purpose of matching the density of the detector to that of the bulk foodstuff with which it is to be employed. Ballast 8 can be in the form of cards, or discrete solid bodies, or granules.

In the embodiment shown in FIG. 2, the two halves of body 2 are connected together by a threaded shank 10 fastened to one body half and an internally threaded tube 12 fastened to the other body half. A compression spring 14 is interposed between the upper edge of tube 12 and the surface of the upper body half to which shaft 10 is fastened. With this arrangement, the two halves can be joined together by screwing shaft 10 into tube 12. When the parts are unscrewed from one another by a small amount, spring 14 forces them apart, leaving a gap through which additional ballast material can be introduced or removed in order to adjust the density of the detector.

Reverting to FIG. 1, each sensor 6 is constituted by a support body having a configuration suitable for mounting on a facet 4 and for subsequent introduction into an analyzer. The support body carries a sensor chip 22 of radiation sensitive material and may be provided, on its surface, with a bar code identifying the radiation sensitive material in order to permit automatic data handling and treatment of the reading of the recorded radiation dose.

Figure 3:
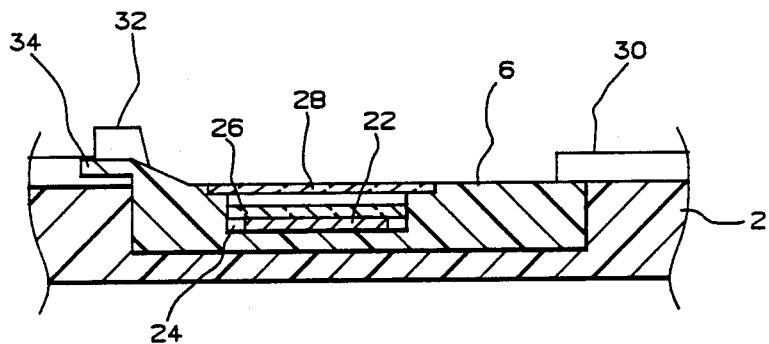
FIG. 3 is a cross-sectional view taken along the cross-sectional line of FIG. 1.

As shown in the cross-sectional view of FIG. 3, the plane of which is the cross-sectional line shown in FIG. 1, the support body of sensor 6 is provided with a circular well 24 in which is disposed the chip 22. Chip 22 is covered, and held in place, by a shield 26, and the open end of well 24 is closed by a protective cover 28. Shield 26 and cover 28 are removable to expose chip 22 for reading purposes.

Shield 26 is provided for the purpose of equilibrating the dose level of the incident radiation to bring that level into a selected range at which the radiation sensitive material of chip 22 will produce an accurate dose indication. It is standard practice to enclose such a dosimetry device within an "equalizing capsule" when making accurate measurements. For this purpose, shield 26 will be made of a suitable material having a suitable thickness, generally 3 mm. when using polyethylene.

Protective cover 28 essentially provides mechanical protection. The protective cover could also serve as the shield.

Figure 4:
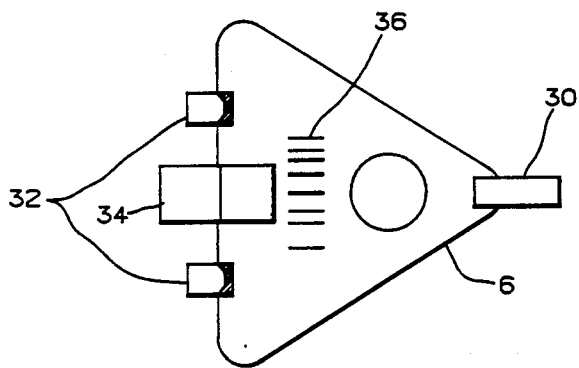
FIG. 4 is a detail plan of the elements shown in FIG. 3.

Sensor 6 is installed in a receiving well formed in the associated facet of body 2. In order to secure sensor 6 in place, body 2 is provided, in the region of the associated facet, with a retaining tab 30 and, at the opposite side of sensor 6, with resilient latches 32. Sensor 6 is provided with a lifting tab 34 by means of which sensor body 6 can be forced past tabs 32 for removal from body 2. The relation between tabs 30, 32 and 34 is further shown in the detail plan view of FIG. 4, which also illustrates a bar code 36 provided on sensor body 6.

Alternatively, sensor body 6 can be fastened to body 2 by plastic screws.

Chip 22 can be constituted by any suitable, known radiation monitoring material, and is preferably a thermoluminescent detector material. Use may be made, for example, of a radiation sensitive material marketed by the Harshaw Chemical Company, under the model designation TLD-200. This material is commercially available in the form of discs, rods and powder. The disc or rod form can be sliced to the desired thickness, while the powder form can be used to give the chip any desired shape. This is dysprosium activated calcium flouride and, for one exemplary embodiment of the invention, the chip 22 employed in each sensor device can be a body having a square cross section measuring approximately 6.35 mm along each side and having a thickness of approximately 0.9 mm. Such a chip is reusable indefinitely.

However, other sensitive materials, incorporating phosphors having different characteristics are available to satisfy various dosimetry requirements and can be selected to cover radiation values extending from the $\mu R$ range to the MR range. One additional material is lithium fluoride. Existing materials enable accurate measurements of gamma ray doses to be easily made.

Detector body 2 should be of a material which will not substantially interact with, or absorb, the incident radiation. For this purpose, the body can be made of a plastic having a low atomic number, such as a polyethylene or a polypropylene. In order for the material to be one which will not interact with the radiation, it should be a material which is not or is minimally cross-linkable.

According to a further feature of the invention, the device may be provided with a tether 38, possibly in the form of a length of cord, to facilitate extraction of the detector from the bulk food material after passage through the radiation region. The tether need not be secured at its free end, but its presence will aid the operator in locating the detector. A tether is preferably used when the detector is to be employed in conjunction with material in the form of small particles, such as spices or flour, but is not necessary when the detector is employed for monitoring irradiation of larger objects, such as fresh fruits or vegetables, in which case the detector can be easily located and retrieved after having passed beyond the irradiation region. One additional use of the tether would be to maintain the detector at a fixed distance from the source to aid in calibration purposes.

After a detector according to the present invention has passed through the irradiation region and been recovered, the individual devices 6 are removed therefrom, and the dose received by each radiation sensor is measured. This can be done in an automated thermoluminescent detector readout system of the type which is commercially available complete with calibration and sensor identification. After the radiation doses have been read, the resulting data is processed to determine average dose and the sensors can be reactivated and reinstalled on the body 2, ready to be reused.

Figure 5:
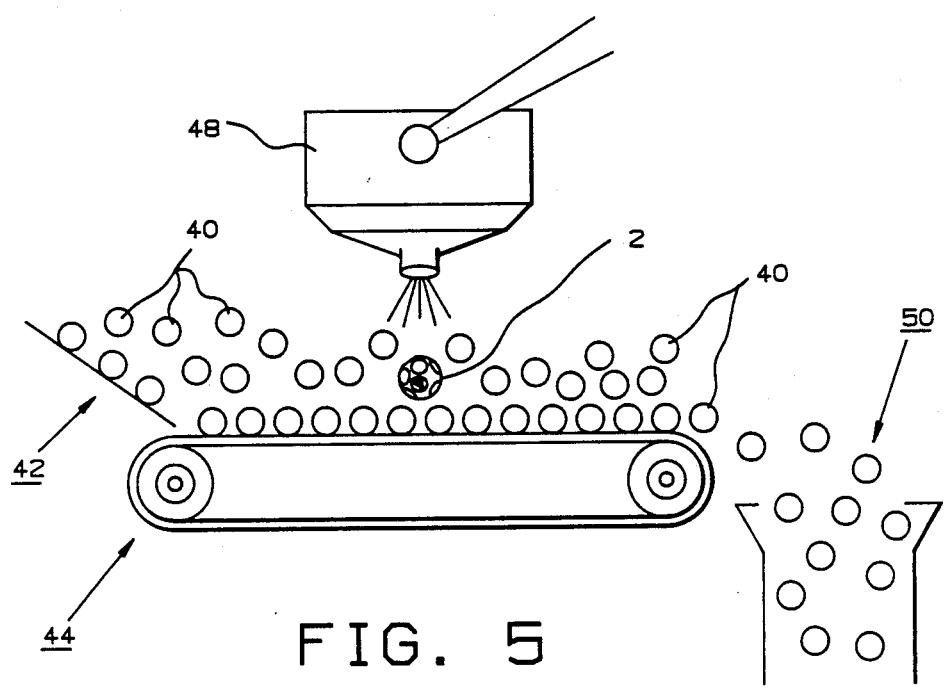
FIG. 5 is a pictorial view of an irradiation system.

FIG. 5 illustrates, in simplified pictorial form, a typical irradiation system in which the present invention can be employed. Food items 40, such as apples or oranges, in bulk volume, are conveyed from a feed region 42 onto a conveyor belt system 44, with one or more detectors introduced into the volume at selected intervals. Each detector is conveyed along conveyor belt system 44 along with the food items 40 and passes through the region irradiated by a suitable radiation source 48. After irradiation, the food items 40 together with the detector are delivered to an outlet hopper 50, after which each detector can be recovered and its sensitive elements subjected to analysis.

Because sensors 6 are distributed uniformly around the surface of a generally spherical body 2, the average radiation dose reading resulting from analysis of the individual sensor elements will be independent of the orientation of the body in the mass of bulk material being monitored.

When a device according to the invention is being carried along with a mass of bulk material, it should preferably be introduced so that when passing through the irradiation region, it is at a sufficient depth in the bulk material to accurately monitor the average radiation dose.

Embodiments of the device according to the invention can be comparable in size to an orange or grapefruit.

A dosimeter according to the invention could also be used to mimic foodstuff packaged in crates and located in a stack of crates for irradiation. In this case the dosimeter would determine the maximum and minimum dose levels received by individual foodstuffs.

It will be understood that the above description of the present invention is susceptible to various modifications, changes and adaptations, and the same are intended to be comprehended within the meaning and range of equivalents of the appended claims.

I claim:
1. A device for monitoring the irradiation of bulk material comprising:
   a carrier body having an outer surface formed to present a plurality of facets and constructed to receive a radiation sensor on each facet; and
   a plurality of radiation sensors each removably mounted on a respective facet of said carrier body and each disposed to receive radiation impinging on said outer surface and emanating outside of said body.

2. A device as defined in claim 1 wherein said carrier body is a hollow body having an interior provided for the introduction of ballast material to adjust the density of said device.

3. A device as defined in claim 1 wherein said carrier body is provided, at each said facet, with means for removably retaining a respective radiation sensor.

4. A device as defined in claim 1 wherein said carrier body is of a plastic material selected to have minimum interaction with the radiation to be sensed.

5. A device as defined in claim 4 wherein said plastic material is selected to have a low atomic number.

6. A device as defined in claim 5 wherein said plastic material is polyethylene or polypropylene.

7. A device as defined in claim 1 further comprising means defining a flexible tether secured to said carrier body.

8. A device as defined in claim 1 wherein each of said radiation sensors includes a body of thermoluminescent detector material.

9. A device as defined in claim 1 wherein each of said radiation sensors is constructed compatible with an automated radiation dose readout system.

10. A method for monitoring the radiation dose applied to bulk material by a radiation source as the material is conveyed past the radiation source, comprising:
   providing a device for monitoring the irradiation of bulk material comprising: a carrier body having an outer surface formed to present a plurality of facets and constructed to receive a radiation sensor on each facet; and a plurality of radiation sensors each removably mounted on a respective facet of said carrier body;
   introducing said device into a mass of the bulk material prior to conveyance of the bulk material past the radiation source;
   conveying said device along with the bulk material past the radiation source;
   removing said device from the bulk material after said device has passed beyond the region irradiated by the radiation source;
   removing the sensors from the carrier body of said device; and
   reading the radiation dose detected by each sensor.

11. A method as defined in claim 10 wherein said step of introducing is carried out to place said device at a selected depth in the mass of bulk material.

12. A method as defined in claim 10 comprising the preliminary step of giving the device an effective density corresponding to that of the bulk material into which said device is subsequently introduced.

13. A method for monitoring the radiation dose applied to bulk material by a radiation source, comprising:
   providing a device for monitoring the irradiation of bulk material comprising: a carrier body having an outer surface formed to present a plurality of facets and constructed to receive a radiation sensor on each facet; and a plurality of radiation sensors each removably mounted on a respective facet of said carrier body;
   introducing said device into a mass of the bulk material prior to exposure of the bulk material to the radiation source;
   removing said device from the bulk material after said device and the bulk material have been irradiated by the radiation source;
   removing the sensors from the carrier body of said device; and
   reading the radiation dose detected by each sensor.

* * * * *